(12) United States Patent
Morita et al.

(10) Patent No.: US 12,019,787 B2
(45) Date of Patent: Jun. 25, 2024

(54) ARITHMETIC DEVICE

(71) Applicant: HITACHI ASTEMO, LTD., Hitachinaka (JP)

(72) Inventors: Nobuyoshi Morita, Tokyo (JP); Kota Ideguchi, Tokyo (JP); Hiroki Yamazaki, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 298 days.

(21) Appl. No.: 17/604,653

(22) PCT Filed: Apr. 20, 2020

(86) PCT No.: PCT/JP2020/017086
§ 371 (c)(1),
(2) Date: Oct. 18, 2021

(87) PCT Pub. No.: WO2020/213744
PCT Pub. Date: Oct. 22, 2020

(65) Prior Publication Data
US 2022/0215131 A1 Jul. 7, 2022

(30) Foreign Application Priority Data

Apr. 19, 2019 (JP) .................................. 2019-080069

(51) Int. Cl.
*G06F 21/64* (2013.01)
*G06F 7/57* (2006.01)

(52) U.S. Cl.
CPC ................ *G06F 21/64* (2013.01); *G06F 7/57* (2013.01)

(58) Field of Classification Search
CPC ............. G06F 21/64; G06F 7/57; G06F 21/74
See application file for complete search history.

(56) References Cited

U.S. PATENT DOCUMENTS

2010/0131816 A1* 5/2010 Yamamoto .......... H04L 12/4013
709/204
2014/0247786 A1* 9/2014 Izu ...................... H04W 12/122
370/329

(Continued)

FOREIGN PATENT DOCUMENTS

| CN | 107888710 A | * | 4/2018 | ............. H04L 67/06 |
| JP | 2008-176646 A | | 7/2008 | |

(Continued)

OTHER PUBLICATIONS

Extended European Search Report issued on Dec. 13, 2022 for European Patent Application No. 20791242.9.

(Continued)

*Primary Examiner* — Trong H Nguyen
(74) *Attorney, Agent, or Firm* — Volpe Koenig

(57) ABSTRACT

An arithmetic device includes a first core, a second core, and one or more other cores that perform arithmetic processing. The first core includes a first verification unit that performs a first verification process on a message received from outside of the arithmetic device. The second core includes a verification destination determination processing unit that determines whether or not the second core executes the second verification process on the message based on identification information included in the message.

5 Claims, 9 Drawing Sheets

(56) References Cited

U.S. PATENT DOCUMENTS

| | | | |
|---|---|---|---|
| 2016/0297401 A1 | 10/2016 | Haga et al. | |
| 2018/0063301 A1 | 3/2018 | Patel et al. | |
| 2018/0131524 A1* | 5/2018 | Shin | H04L 9/14 |
| 2019/0013930 A1 | 1/2019 | Munir et al. | |

FOREIGN PATENT DOCUMENTS

| | | |
|---|---|---|
| JP | 2008-306592 A | 12/2008 |
| JP | 2015-171008 A | 9/2015 |
| JP | 2019-004518 A | 1/2019 |
| JP | 2019-041228 A | 3/2019 |

OTHER PUBLICATIONS

Matsumoto, Tsutomu et al., "Car2Cloud Communication Enhanced by In-Vehicle Implicit Asking", IEICE Technical Report, 2013, vol. 113, No. 53, pp. 23-28.

International Search Report, PCT/JP2020/017086, Jul. 14, 2020, 3 pgs.

* cited by examiner

FIG. 3

700 VERIFICATION DETERMINATION INFORMATION

| 701 PROCESSING ID | 702 PROCESSING PROPRIETY |
|---|---|
| 0 x 0 0 1 | 1 |
| 0 x 0 0 2 | 0 |
| 0 x 0 0 3 | 0 |
| 0 x 0 0 4 | 1 |

FIG. 4

800 VERIFICATION REQUEST DESTINATION INFORMATION

| 801 PROCESSING ID | 802 CORE ID |
|---|---|
| 0 x 0 0 1 | 0 x 0 0 2 |
| 0 x 0 0 2 | 0 x 0 0 3 |
| 0 x 0 0 3 | 0 x 0 0 3 |
| 0 x 0 0 4 | 0 x 0 0 2 |

FIG. 5

| | | 900 |
|---|---|---|
| AUTHORITY MANAGEMENT INFORMATION | | |

| PROCESSING ID | FIRST CORE AUTHORITY | SECOND CORE AUTHORITY | THIRD CORE AUTHORITY |
|---|---|---|---|
| 0x001 | 0 | 1 | 0 |
| 0x002 | 0 | 1 | 1 |
| 0x003 | 0 | 0 | 1 |
| 0x004 | 1 | 0 | 0 |

(901, 902, 903, 904)

ARITHMETIC DEVICE

TECHNICAL FIELD

The present invention relates to an arithmetic device.

BACKGROUND ART

An in-vehicle system of an automobile is beginning to be connected to a center system and a device outside the vehicle. Accompanying therewith, preparation against cyber security attacks from outside the vehicle has become important. However, many of the control devices mounted in the in-vehicle system operate with limited resources. Patent Literature 1 discloses a multiprocessor system that executes processing while mutually using resources of each of a plurality of processors, the multiprocessor system including an execution permission determination means that determines whether or not to permit execution of processing belonging to a second processor using resources of the second processor by a first processor.

CITATION LIST

Patent Literature

PTL 1: JP 2008-176646 A

SUMMARY OF INVENTION

Technical Problem

In the invention described in Patent Literature 1, safety measures are not sufficient. In particular, in an environment in which a multiprocessor core is mounted, when an unauthorized message is received, a countermeasure when the first verification is broken or avoided is not sufficient.

Solution to Problem

An arithmetic device according to a first aspect of the present invention relates to an arithmetic device including a first core, a second core, and one or more other cores that perform arithmetic processing, where the first core includes a first verification unit that performs a first verification process on a message received from outside of the arithmetic device; and the second core includes a verification destination determination processing unit that determines whether or not the second core executes a second verification process on the message based on identification information included in the message.

An arithmetic device according to a second aspect of the present invention relates to an arithmetic device including three or more cores that perform arithmetic processing, the arithmetic device including an interface unit that receives a message from outside of the arithmetic device; a first verification unit that performs a first verification process on the message; and a second verification unit that performs a second verification process on the message; and a specification unit that specifies the core to execute the second verification process based on identification information included in the message; where the first verification unit and the second verification unit are realized by different cores.

Advantageous Effects of Invention

According to the present invention, in an environment in which a multiprocessor core is mounted, even if the first verification is broken or avoided when an unauthorized message is received, the target device can be protected from the unauthorized message by the second verification.

BRIEF DESCRIPTION OF DRAWINGS

FIG. 3 is a diagram illustrating an example of verification determination information.

FIG. 4 is a diagram illustrating an example of verification request destination information.

FIG. 5 is a diagram illustrating an example of authority management information.

DESCRIPTION OF EMBODIMENTS

Embodiment

Hereinafter, an embodiment of an arithmetic device according to the present invention will be described with reference to FIGS. 1 to 9.

(Hardware Configuration)

Figure 1:
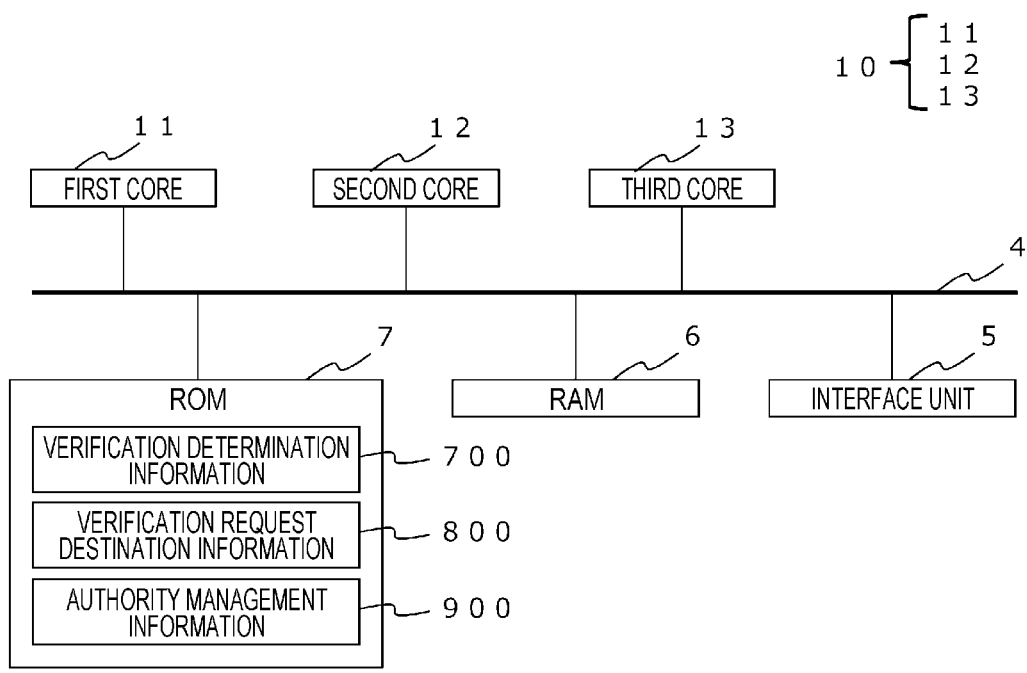
FIG. 1 is a hardware configuration diagram of an arithmetic device.

FIG. 1 is a hardware configuration diagram of an arithmetic device 1 according to the present invention. In the arithmetic device 1, a first core 11, a second core 12, a third core 13, an interface unit 5, a RAM 6, and a ROM 7 are connected via a communication bus 4. The first core 11, the second core 12, and the third core 13 develop and execute the programs stored in the ROM 7 in the RAM 6, thereby implementing the functions described later. Hereinafter, the first core 11, the second core 12, and the third core 13 are collectively referred to as a core 10. Each of the first core 11, the second core 12, and the third core 13 is a physical core, and may be independently packaged, or the core 10 may be enclosed in one package.

Note that the ROM 7 stores verification determination information 700, verification request destination information 800, and authority management information 900. The verification determination information 700, the verification request destination information 800, and the authority management information 900 are referred to by the core 10. Specific description of the verification determination information 700, the verification request destination information 800, and the authority management information 900 will be given later.

The interface unit 5 receives a communication message from outside the arithmetic device 1 and saves the communication message in the RAM 6. In addition, the interface unit 5 transmits information saved in the RAM 6 or the RAM 7 to the outside of the arithmetic device 1 as a communication message. The communication bus standard to which the interface unit 5 corresponds is CAN (registered trademark), LIN (registered trademark), FlexRay (registered trademark), Ethernet (registered trademark), or the like. The interface unit 5 may correspond to at least one communication standard.

The communication message is electronic data transmitted and received through communication, and is also referred to as a "packet", a "data frame", a "datagram", or the like. Furthermore, the communication message does not have to be a "packet" or the like itself, and may be, for example, a plurality of "packets" or the like combined or decoded according to a predetermined procedure. Furthermore, the communication message may be the entire message including the header or only the payload excluding the header.

(Functional Configuration)

Figure 2:
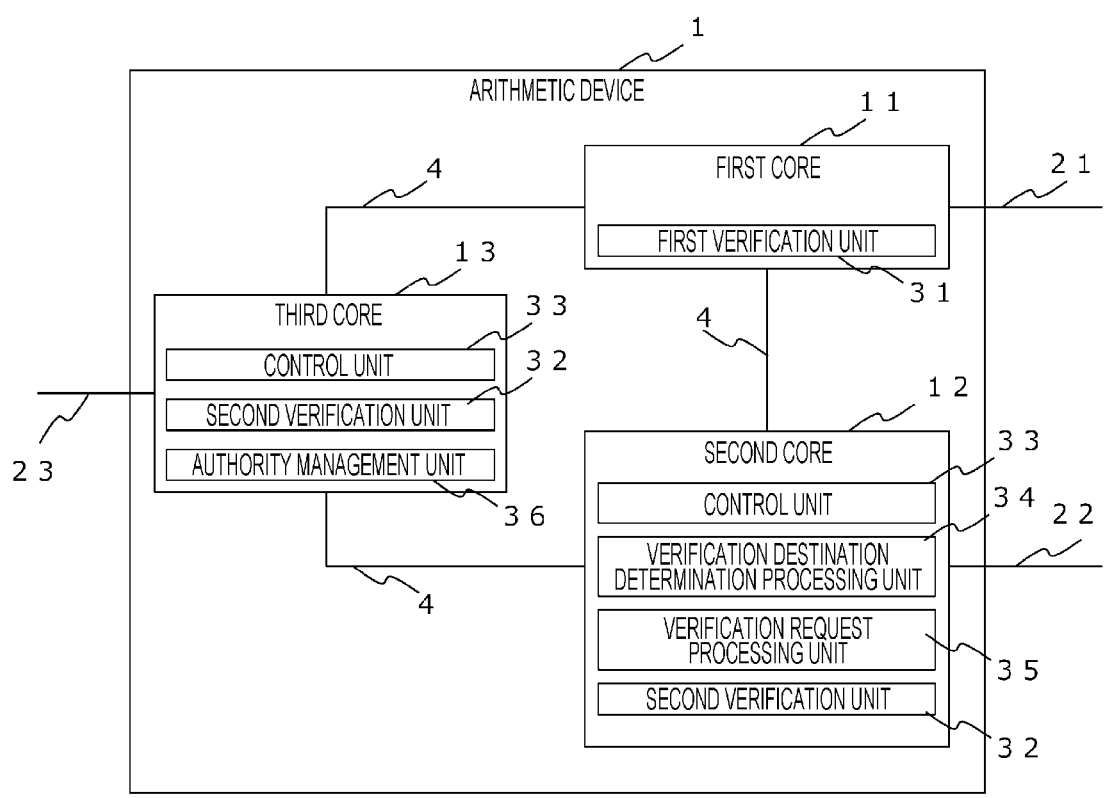
FIG. 2 is a functional configuration diagram of the arithmetic device.

FIG. 2 is a functional configuration diagram of the arithmetic device 1. The arithmetic device 1 is connected to a first bus 21, a second bus 22, and a third bus 23. The arithmetic device 1 is mounted on a vehicle, for example, the first bus 21 and the second bus 22 are communication buses connected to the outside of the vehicle, and the third bus 23 is a communication bus connected to the inside of the vehicle. The second bus 22 can also be referred to as an "internal communication bus", and the third bus 23 can also be referred to as an "external communication bus". For example, a message received from the outside of the vehicle by a wireless communication unit (not illustrated) is input to the arithmetic device 1 via the first bus 21 and the second bus 22, and output to the third bus 23 inside the vehicle via the arithmetic device 1. An electronic control device that controls the vehicle is connected to the third bus 23. In the present embodiment, an operation for describing verification of authenticity of a communication message received by the arithmetic device 1 via the first bus 21 will be mainly described.

The relationship between the communication bus and the core 10 illustrated in FIG. 2 is conceptual, and a message input from each communication bus is first processed by the connected core 10. For example, when the arithmetic device 1 receives a message from the first bus 21, which is a situation mainly described in the present embodiment, the first core 11 first performs a process. Specifically, the first core 11 performs the first verification, and the other cores perform the second verification. Details will be described later. Hereinafter, the first verification may be referred to as "first verification" or "first verification". Hereinafter, the second verification may be referred to as "second verification" or "second verification".

Each of the first bus 21, the second bus 22, and the third bus 23 may be physically a plurality of communication buses. Standards of communication buses to which each of the first bus 21, the second bus 22, and the third bus 23 corresponds may all be the same or may be different. The standard of the communication bus to which the first bus 21, the second bus 22, and the third bus 23 correspond is the standard of the interface unit 5 illustrated in FIG. 1 or the like.

The arithmetic device 1 includes, as its functions, a first verification unit 31, a second verification unit 32, a control unit 33, a verification destination determination processing unit 34, a verification request processing unit 35, and an authority management unit 36. In the present embodiment, the first core 11 executes the first verification unit 31, the second core 12 executes the second verification unit 32, the control unit 33, the verification destination determination processing unit 34, and the verification request processing unit 35, and the third core 13 executes the second verification unit 32, the control unit 33, and the authority management unit 36.

The second verification unit 32 and the control unit 33 are executed by both the second core 12 and the third core 13. This does not mean that two cores perform one processing in cooperation, but that each core can execute processing independently. That is, each of the second verification unit 32 and the control unit 33 may be executed by the second core 12 or may be executed by the third core 13. Which core performs the above-described process will be described later. Note that since the same output can be obtained for a certain input, the second verification unit 32 and the control unit 33 are denoted with the same reference numerals regardless of the core that executes the same, and means for realizing each may be different. For example, the program code for the second core 12 to realize the second verification unit 32 and the program code for the third core 13 to realize the second verification unit 32 may not be the same.

The first verification unit 31 and the second verification unit 32 verify the authenticity of the communication message received by the arithmetic device 1. The first verification unit 31 and the second verification unit 32 are executed by different cores. In the present embodiment, verification of authenticity of a communication message received by the arithmetic device 1 via the first bus 21 will be mainly described as described above. Therefore, the verification unit of the first core 11 that first verifies the communication message is named differently from the verification units of the second core 12 and the third core 13 for the sake of convenience. The first verification unit 31 and the second verification unit 32 may verify the authenticity of the communication message through the same method or may verify the authenticity of the communication message through different methods.

The verification destination determination processing unit 34 executed by the second core 12 determines whether or not the second core 12 itself executes the second verification of the communication message, that is, the operation of the second verification unit 32. In a case where the verification destination determination processing unit 34 determines that the second verification of the communication message should be requested to a processor core other than itself, the verification request processing unit 35 executed by the second core 12 requests the processor core corresponding to a predetermined rule to verify the communication message.

The control unit 33 executed by the second core 12 and the third core 13 executes a predetermined process according to the given authority.

The authority management unit 36 executed by the second core 12 and the third core 13 controls the authority to be given to each core 10 according to the processing content. The authority control is, for example, permission to access a specific area of the RAM 6. The authority management unit 36 controls the authority only for the processing content of which authenticity is confirmed in the verification result of the second verification unit 32. That is, in a case where the authenticity cannot be confirmed by any of the first verification unit 31 and the second verification unit 32, the authority is not changed. The authority management unit 36 is preferably provided only in the third core 13 that is not directly connected to the outside of the vehicle.

(Verification Determination Information 700)

FIG. 3 is a diagram illustrating an example of the verification determination information 700. The verification determination information 700 has a plurality of records, and each record has fields of a processing ID 701 and a processing propriety 702. The processing ID 701 is an identifier for identifying processing contents to be executed. The processing ID 701 may have any format as long as it can be identified, and may be any numerical value as illustrated in FIG. 3, an IP address, or the like. The processing propriety 702 indicates whether or not the second core 12 itself processes the communication message having the processing ID 701 of the same record. In the example illustrated in FIG. 3, "1" indicates that the second core 12 itself performs processing, and "0" indicates that a core other than the second core 12 performs processing. The processing ID 701 may be included in the communication message, and when the processing ID is distinguished for each communication message, the communication ID may be used as the processing ID.

The verification destination determination processing unit 34 refers to the verification determination information 700 to determine whether or not the second core 12 processes the received communication message. The verification destination determination processing unit 34 first specifies the processing ID of the received communication message. Next, the verification destination determination processing unit 34 reads the propriety of the process corresponding to the specified processing ID from the verification determination information 700. When the read processing propriety is "1", it is determined that the second core 12 performs the process, and when the read processing propriety 702 is "0", it is determined that the second core 12 does not perform the process.

(Verification Request Destination Information 800)

FIG. 4 is a diagram illustrating an example of the verification request destination information 800. The verification request destination information 800 has a plurality of records, and each record has fields of a processing ID 801 and a core ID 802. The processing ID 801 is an identifier for identifying processing contents to be executed, and is the same as 701 of the verification determination information 700. The core ID 802 indicates an identifier of the core 10 that verifies a communication message having the processing ID 701 of the same record. The core ID 802 is any of, for example, "0x001" corresponding to the first core 11, "0x002" corresponding to the second core 12, or "0x003" corresponding to the third core 13. However, in the present embodiment, since the first core 11 performs the first verification, the core 10 indicated by the core ID 802 of the verification request destination information 800 is either the second core 12 or the third core 13.

The verification request processing unit 35 refers to the verification request destination information 800 to specify the verification request destination of the received communication message. The verification request processing unit 35 first specifies a processing ID of the received communication message. Next, the verification request processing unit 35 reads the core 10 that performs the second verification of the communication message having the specified processing ID from the verification determination information 700. When the read core ID 802 is "0x002", the second core 12 itself is requested to perform the process, and when the read core ID is "0x003", the third core 13 is requested to perform the process.

(Authority Management Information 900)

FIG. 5 is a diagram illustrating an example of the authority management information 900. The authority management information 900 has a plurality of records, and each record has fields of a processing ID 901, a first core authority 902, a second core authority 903, and a third core authority 904. The processing ID 901 is an identifier for identifying processing contents to be executed, and is the same as 701 of the verification determination information 700 and 801 of the verification request destination information 800. Each of the first core authority 902, the second core authority 903, and the third core authority 904 indicates presence or absence of authorization to each of the first core 11, the second core 12, and the third core. In the example illustrated in FIG. 5, "0" indicates that the authority is not to be given, and "1" indicates that the authority is to be given.

In the example illustrated in FIG. 5, only the presence or absence of authorization is illustrated, but the type, range, and the like of the authority to be given may also be illustrated. The type of authority is, for example, only reading, only writing, reading and writing, and the like. The range of authority is, for example, a range of street number in an address space or a temporal range in which authority is given.

The authority management unit 36 refers to the authority management information 900 and gives the authority necessary for the process caused by the received communication message. The authority management unit 36 first specifies the processing ID of the received communication message. Next, the authority management unit 36 gives authority to the core 10 corresponding to the specified processing ID. For example, when the processing ID is "0x002", the authority management unit 36 gives authority to the second core 12 and the third core.

(Sequence Diagram)

Figure 6:
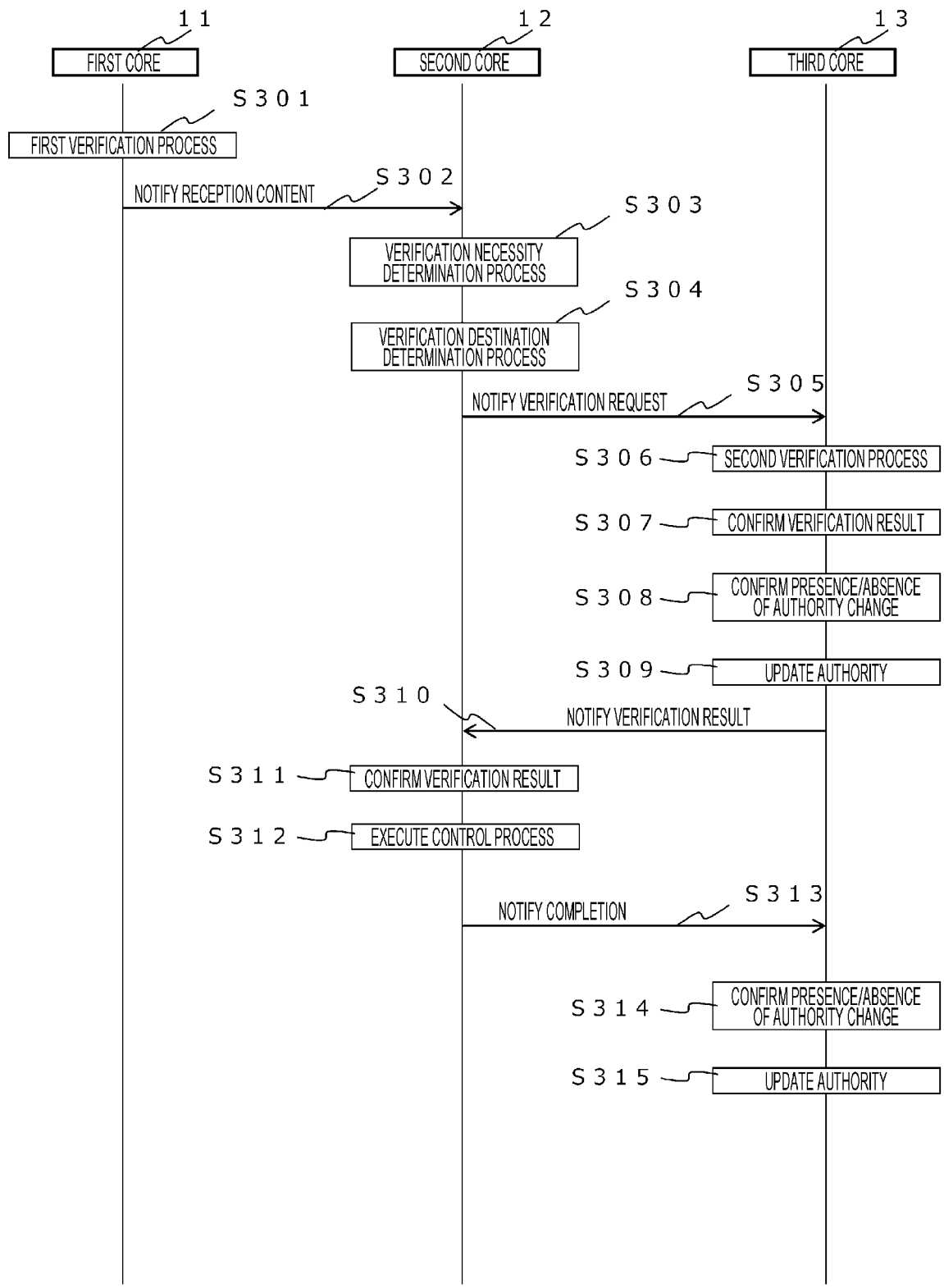
FIG. 6 is an overall processing sequence diagram of an authentication system.

FIG. 6 is an overall processing sequence diagram of the authentication system when the first core 11 receives a communication message. In step S301, the first verification unit 31 verifies the authenticity of the communication message received via the interface unit 5 on the basis of a predetermined rule. In the subsequent step S302, the first core 11 notifies the second core 12 that the communication message has been received. Note that in a case where the authenticity cannot be confirmed in step S301, the first core 11 performs abnormality handling process.

In the subsequent step S303, the verification destination determination processing unit 34 realized by the second core 12 determines whether or not to request the core 10 other than itself, that is, other than the second core 12 to perform the second verification of the communication message of which the authenticity has been verified in step S301. However, in the description of this drawing, it is assumed that the verification destination determination processing unit 34 determines in step S303 that the verification is to be requested to the core 10 other than itself.

The verification request processing unit 35 determines the core 10 to be a verification destination to which the second verification of the communication message is requested (step S304), and notifies the core 10 of the verification request (step S305). In step S306, the second verification unit 32 of the third core 13 verifies the authenticity of the communication message of which the first verification has been performed in step S301 based on a predetermined rule. In step S307, the second verification unit 32 confirms the presence or absence of authenticity, which is the verification result of step S306.

In step S308, in a case where the authenticity is confirmed in step S307, the authority management unit 36 confirms whether or not it is necessary to give authority in the processing of the communication message. In step S309, the authority management unit 36 gives the authority determined to be necessary in step S308, that is, updates the authority. In step S310, the third core 13 notifies the second core 12 of the verification result confirmed in step S307.

In step S311, the verification request processing unit 35 confirms authenticity and authorization according to the verification result notified in step S310. In step S312, the control unit 33 executes the communication message according to a predetermined processing. In step S313, the second core 12 notifies the third core 13 that the processing of the communication message has completed.

In step S314, when receiving the completion notification notified in step S313, the authority management unit 36 confirms whether or not the authority has been given in step S309. In step S315, when it is confirmed in step S314 that the authority has been given, the authority management unit 36 cancels the given authority.

According to the above steps, in the authentication processing system, when the arithmetic device 1 receives a communication message from outside the device, in addition to the first verification by the first core 11, the second core 12 or the third core 13 executes the second verification via the second core 12 that has not received a message from outside the device, and the vehicle can be maintained in a safe state against unauthorized communication transmitted from outside the vehicle.

(Flowchart of First Core 11)

Figure 7:
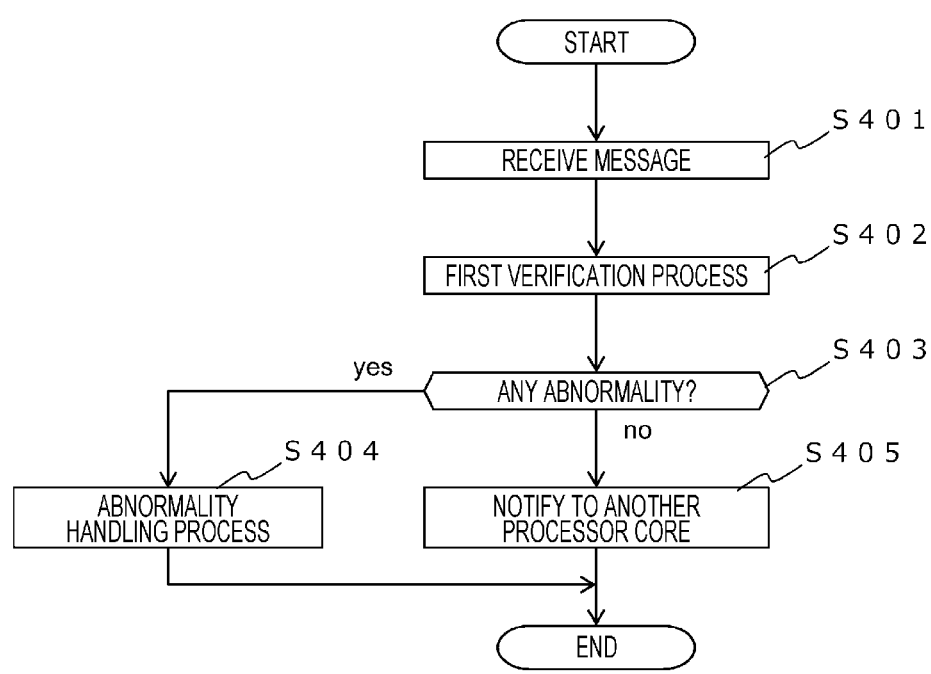
FIG. 7 is a flowchart illustrating an operation of a first core in FIG. 6.

FIG. 7 is a flowchart illustrating processes related to step S301 to step S302 of the first core 11 in FIG. 6. Specifically, the flowchart illustrated in FIG. 7 illustrates a process of verifying the communication message and notifying the second core 12 of the reception of the communication message.

In step S401, the first core 11 receives a communication message from outside the device using the interface unit 5. In the subsequent step S402, the first core 11 verifies whether or not the communication message received in step S401 is a correct communication message using the first verification unit 31. For example, the first verification unit 31 may adopt any one of the following three determination methods or may adopt other methods.

A first method is a method of determining as correct when a communication ID included in the communication message is a predetermined communication ID, and determining as not correct when the communication ID is not the predetermined communication ID. A second method is a method of determining as correct when a communication message is received within a predetermined communication cycle, and determining as not correct when the communication message is not received within the communication cycle. A third method is a method of determining as correct when a value of a message authentication code (MAC) included in the communication message matches a value of a MAC generated on the basis of the communication message, and determining as not correct when the values do not match.

In step S403, the first core 11 proceeds to step S405 when determining that the communication message is correct in step S402, and proceeds to step S404 when determining that the communication message is not correct. In step S404, the first core 11 executes a predetermined abnormality handling process. For example, the first core 11 may discard the received communication message, and in addition, may notify the inside and outside of the device that an abnormality has occurred.

In step S405, the first core 11 notifies the second core 12 that the communication message has been received. However, the first core 11 may notify the predetermined core 10 other than the second core 12, or may notify the core 10 corresponding to the communication ID included in the communication message. Furthermore, the first core 11 may check the processing load of the core 10 other than itself and notify the core 10 in which the processing load is less than or equal to a certain standard, or may notify all the processor cores other than itself.

(Flowchart of Second Core 12)

Through the above steps, the first core 11 can verify the received communication message and notify another processor core of the reception of the communication message based on the verification result.

Figure 8:
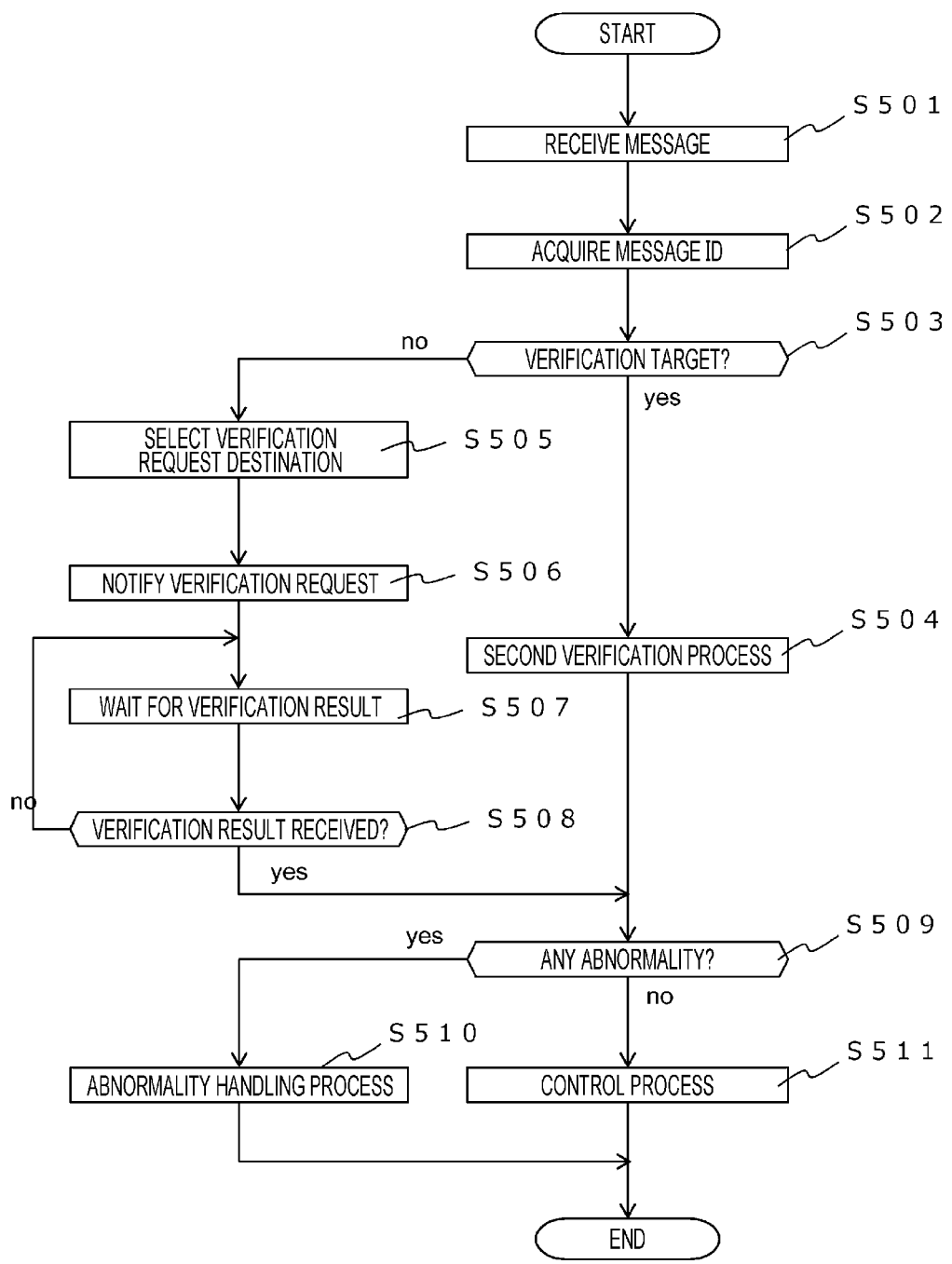
FIG. 8 is a flowchart illustrating an operation of a second core in FIG. 6.

FIG. 8 is a flowchart illustrating processing of the second core 12 in FIG. 6, that is, processes from step S303 to step S305 and processes from step S311 to step S313. Specifically, the flowchart illustrated in FIG. 8 illustrates a process of determining the necessity of verification of a communication message, determining a verification destination according to the determination result, and executing a control process according to the verification result.

In step S501, the second core 12 receives the notification on the reception of the communication message from the first core 11 and acquires the communication message. In step S502, the second core 12 acquires the communication ID included in the received communication message. In step S503, the verification destination determination processing unit 34 of the second core 12 refers to the verification determination information 700 and determines whether or not the communication ID acquired in step S502 is a processing target of the second core 12 itself. For example, when the processing ID included in the communication message acquired in step S501 is "0x002", the verification destination determination processing unit 34 determines that the communication message is not the verification target since the processing propriety 702 is "0" in the verification determination information 700 illustrated in FIG. 3.

In step S504, the second core 12 verifies whether or not the communication message received in step S501 is a correct communication message using the second verification unit 32, and proceeds to step S509. For example, when the communication ID included in the communication message is a predetermined communication ID, determination is made as correct.

In step S505, the verification request processing unit 35 of the second core 12 refers to the verification request destination information 800, and selects a verification request destination. For example, when the processing ID of the communication message acquired in step S501 is "0x002", the verification request processing unit 35 selects the third core 13 as the verification request destination since the core ID 802 associated with the processing ID 801 is "0x003" in the verification request destination information 800 illustrated in FIG. 4.

In step S506, the verification request processing unit 35 of the second core 12 transmits a verification request notification to the verification request destination selected in step S505. In step S507, the second core 12 waits for the result of the verification request transmitted in step S506 to be returned. In step S508, the second core 12 proceeds to step S509 when receiving the verification result, and returns to step S507 when not receiving the verification result.

In step S509 executed after step S504 or when an affirmative determination is made in step S508, the second verification unit 32 of the second core 12 confirms the result of the second verification process, and proceeds to step S510 when determination is made that there is an abnormality, and proceeds to step S511 when determination is made that there is no abnormality. In step S510, the second core 12 executes a predetermined abnormality handling process. For example, the received communication message may be discarded, and in addition, the occurrence of an abnormality may be notified to the inside and outside of the device. In step S511, the second core 12 executes a predetermined control corresponding to the processing ID.

Through the above processes, the second core 12 can determine the necessity of verification of the communication message, determine the verification destination according to the determination result, and execute the control process according to the verification result.

(Flowchart of Third Core 13)

Figure 9:
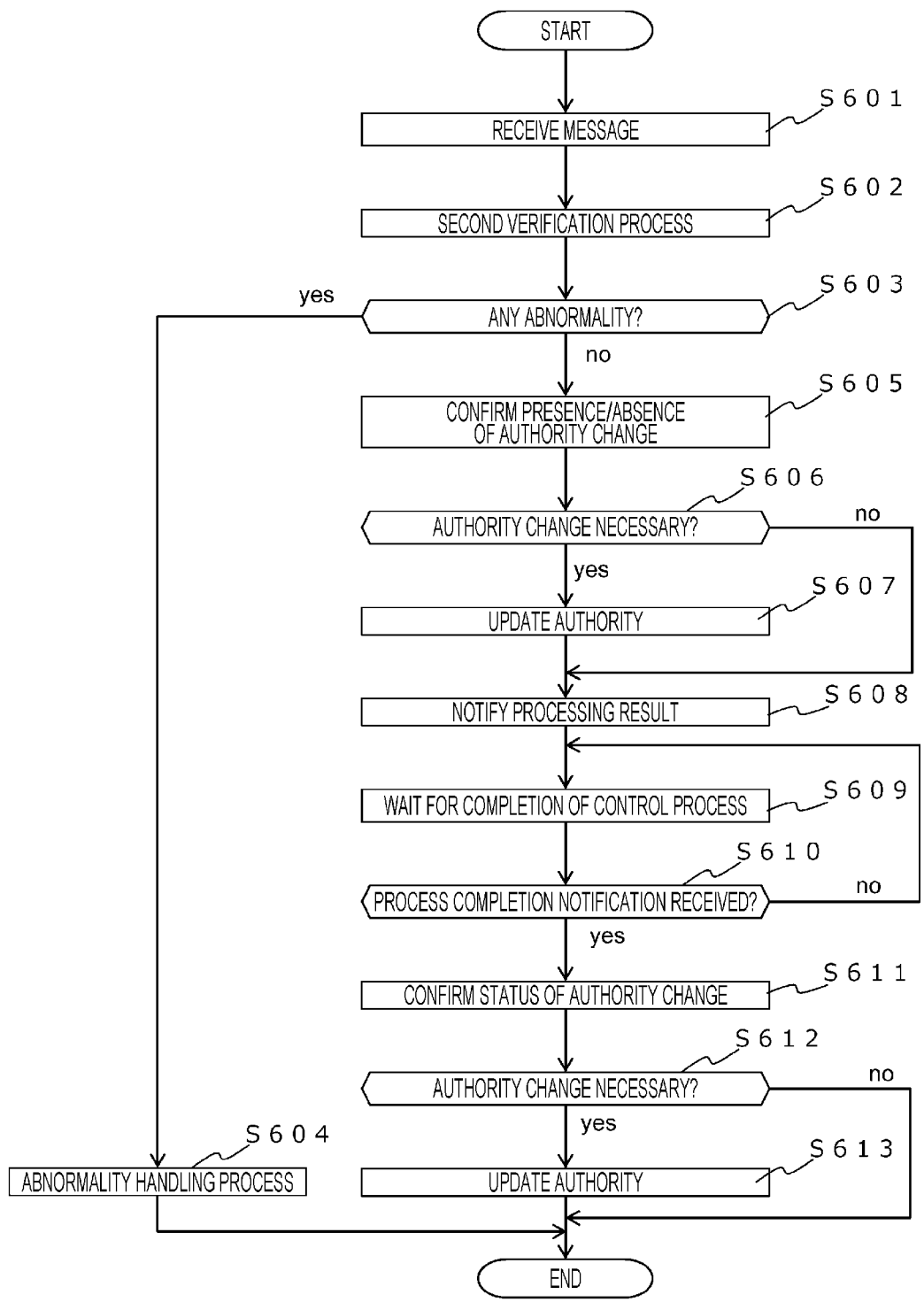
FIG. 9 is a flowchart illustrating an operation of a third core in FIG. 6.

FIG. 9 is a flowchart illustrating processes from step S306 to step S310 and from step S314 to step S315 of the third core 13 in FIG. 6. Specifically, the flowchart illustrated in FIG. 9 illustrates process of performing the second verification process and updating the authority according to the verification result.

In step S601, the third core 13 receives a notification on the reception of the communication message from the second core 12 and acquires the communication message. In step S602, the second verification unit 32 of the third core 13 verifies whether or not the communication message received in step S601 is a correct communication message.

In step S603, the second verification unit 32 of the third core 13 confirms the result of the second verification process, and proceeds to step S604 if there is abnormality, and proceeds to step S605 if there is no abnormality. In step S604, the third core 13 executes a predetermined abnormality handling process. For example, the received communication message may be discarded, and in addition, the occurrence of an abnormality may be notified to the inside and outside of the device.

In step S605, the authority management unit 36 of the third core 13 acquires the processing ID included in the communication message, and refers to the authority management information 900 to confirm whether or not the processing ID requires authority change. For example, if it is unnecessary to give authority to all the cores, authority change is unnecessary. In step S606, the authority management unit 36 of the third core 13 proceeds to step S607 when determining that the authority change is necessary in step S605, and proceeds to step S608 when determining that the authority change is not necessary.

In step S607, the third core 13 refers to the authority management information 900 using the authority management unit 36, and updates the authority of the corresponding processing ID. In step S608, the third core 13 notifies the second core 12 of the verification result in step S602. In the subsequent step S609, the third core 13 waits for the control completion notification from the second core 12. In step S610, the third core 13 proceeds to step S611 when receiving the completion notification of the control process from the second core 12, and returns to step S609 when not receiving the completion notification.

In step S611, the third core 13 confirms the presence or absence of authority change in step S607. For example, an update presence/absence flag having an initial value of "0" is stored in the RAM 6, and the third core 13 updates the update presence/absence flag to "1" when the authority management unit 36 changes any of the authorities, and determines the presence or absence of authority change when the authority management unit 36 confirms the value of the update presence/absence flag.

In step S612, the third core 13 proceeds to step S613 when determining that the authority has been changed in step S611, and terminates the present process when determining that the authority has not been changed. In step S613, the third core 13 changes the authority updated in step S607 to the authority before the update using the authority management unit 36.

Through the above process, the third core 13 can perform the second verification process and update the authority according to the verification result.

The embodiment described above has the following operation effects.

(1) The arithmetic device 1 includes a first core 11, a second core 12, and a third core 13 that perform arithmetic processing. The first core 11 includes a first verification unit 31 that performs a first verification process on a message received from outside the arithmetic device 1. The second core 12 includes a verification destination determination processing unit 34 that determines whether or not the second core 12 executes the second verification process on the message based on the identification information included in the message, that is, the processing ID. Therefore, the arithmetic device 1 is robust against cyberattack through communication from the outside of the vehicle. Specifically, even if the first verification process in the first core 11 that received the message from the outside of the arithmetic device 1 is broken or avoided, the second core 12 or the third core 13, which is a physically different core, executes the second authentication, so that a multi-layer protection that efficiently uses the resources of the multi-processor core can be realized.

(2) The second core 12 further includes a verification request processing unit 35 that, when the verification destination determination processing unit 34 determines that the second core 12 does not execute the second verification process, specifies which core 10 executes the second verification process based on the processing ID which is the identification information and the verification request destination information 800, and requests for execution of the second verification process. Therefore, the core 10 that executes the second verification process can be specified and the execution can be requested.

(3) The third core 13 includes the authority management unit 36 that gives authority to access the RAM 6 to at least one of the first core 11, the second core 12, and the third core 13 based on the information included in the message, that is, the processing ID when no abnormality is found in the first verification process and the second verification process (S603: NO in FIG. 9). Therefore, the arithmetic device 1 can give authority to process the message when no abnormality is found in the two verifications.

(4) When the verification destination determination processing unit 34 determines that the second core 12 executes the second verification process (S503: YES in FIG. 8), the second core 12 executes the second verification process (S504 in FIG. 8).

First Modified Example

At least one of the verification determination information 700 and the verification request destination information 800 may be stored in the ROM 7 of the arithmetic device 1. When the verification determination information 700 is not stored in the ROM 7, the verification destination determination processing unit 34 uses the verification request destination information 800 as a substitute for the verification determination information 700. That is, 34 can be a substitute for the verification determination information 700 by reading the verification request destination information 800 and determining whether or not the core ID 802 indicates the second core 12.

In addition, when the verification request destination information 800 is not stored in the ROM 7, the verification request processing unit 35 determines the third core 13 as the verification request destination without any reference. This is because when there are only 3 cores, only the third core 13 remains according to the method of elimination. Specifically, the cores capable of executing the second verification process are two cores excluding the first core 11 that has performed the first verification process, where if the second core 12 does not execute the second verification process, only the third core 13 can execute the second verification process.

The present modified example has the following operation effects.

(5) The arithmetic device 1 includes three cores. The second core 12 includes a verification request processing unit 35 that requests the third core 13 to execute the second verification process when the verification destination determination processing unit 34 determines that the second core 12 does not execute the second verification process.

Second Modified Example

In the embodiment described above, the verification destination determination processing unit 34 and the verification request processing unit 35 determine the core 10 to execute the second verification process only from the processing ID, which is the identifier included in the message. However, the verification destination determination processing unit 34 and the verification request processing unit 35 may determine the core 10 to execute the second verification process based on the instruction content of the message. More specifically, even in a case of determining that the second core 12 executes the second verification process based on the identification information, the verification destination determination processing unit 34 and the verification request processing unit 35 may determine that the third core 13 executes the second verification process when the instruction content of the message meets a predetermined condition.

The predetermined condition regarding the message is, for example, the following two cases. The first case is a case where an instruction to transfer at least a part of the message to the third bus 23, which is a communication bus connected to the inside of the vehicle, is included. The second case is a case where authority is given in the processing of the message.

The present modified example has the following operation effects.

(6) The arithmetic device 1 is mounted on a vehicle. The arithmetic device 1 is connected to a first bus 21, a second bus 22, which are external communication buses of the vehicle, and a third bus 23, which is an internal communication bus. The first core 11 and the second core 12 transmit and receive messages to and from the external communication bus. The third core 13 transmits and receives messages to and from the internal communication bus. Even in a case of determining that the second core 12 executes the second verification process based on the identification information, the verification destination determination processing unit 34 and the verification request processing unit 35 of the second core 12 may determine that the third core 13 executes the second verification process when the instruction content of the message meets a predetermined condition.

Third Modified Example

In the embodiment described above, the verification destination determination processing unit 34 and the verification request processing unit 35 are provided in the second core 12. However, the verification destination determination processing unit 34 and the verification request processing unit 35 may be provided in the third core 13. In this case, the verification destination determination processing unit 34 and the verification request processing unit 35 may be provided only in the third core 13, or may be provided in the second core 12 and the third core 13.

Note that, in the embodiment, the operation for describing the verification of the authenticity of the communication message received by the arithmetic device 1 via the first bus 21 has been mainly described, but in practice, the verification of the authenticity of the communication message received by the arithmetic device 1 via the second bus 22 is also performed, and hence a configuration in which the verification destination determination processing unit 34 and the verification request processing unit 35 are also provided in the first core 11 is also assumed.

Figure 10:
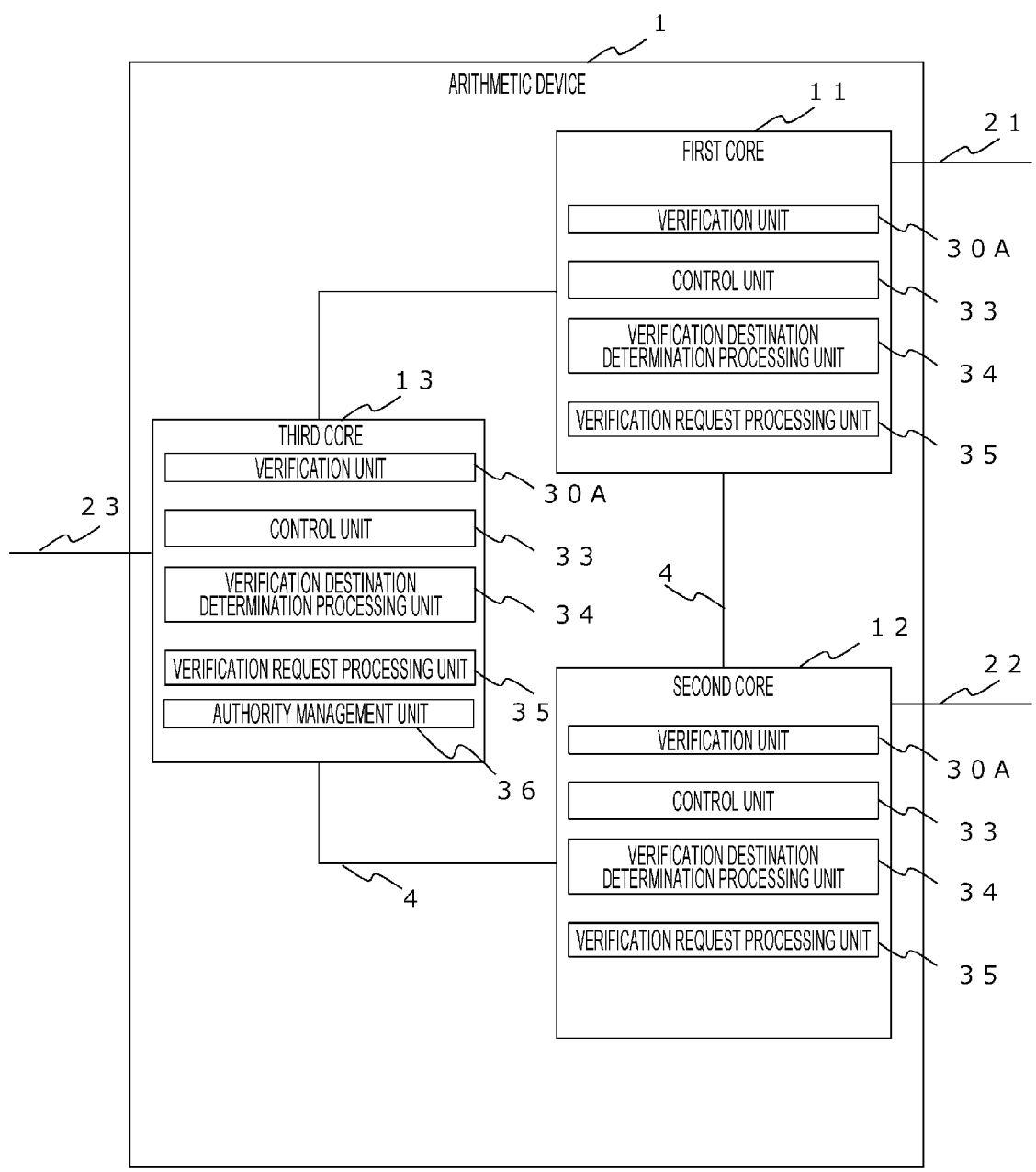
FIG. 10 is a functional configuration diagram of an arithmetic device in a third modified example.

FIG. 10 is a functional configuration diagram of the arithmetic device 1 according to a third modified example. FIG. 10 illustrates the maximum possible configuration, and the verification in the first core 11 and the second core 12 can also be referred to as both the first verification unit 31 and the second verification unit 32 depending on the input source of the message, and hence the verification unit 30A is defined to serve as both verification units. As illustrated in FIG. 10, the functional configurations of the first core 11 and the second core 12 are the same, and the functional configuration of the third core 13 further includes an authority management unit 36 in addition to the functional configurations of the first core 11 and the second core 12.

The present modified example has the following operation effects.

(7) The arithmetic device 1 includes three or more cores that perform arithmetic processing. An interface unit 5 that receives a message from the outside of the arithmetic device 1; a first verification unit 31 that performs a first verification process on the message; a second verification unit 32 that performs a second verification process on the message; and a specifying unit that specifies a core to execute the second verification process based on identification information included in the message, that is, a verification destination determination processing unit 34 and a verification request processing unit 35 are provided. The first verification unit 31 and the second verification unit 32 are realized by different cores. Therefore, various variations can be given in the functional configuration of the arithmetic device 1.

Fourth Modified Example

In the embodiment described above, the arithmetic device 1 includes three cores. However, the arithmetic device 1 may include four or more cores. In this case, in the verification request destination information 800, the variation of the value of the core ID 802 increases according to the number of cores. In addition, in the authority management information 900, a field of each record has a field corresponding to the number of cores. However, since the processing propriety 702 of the verification determination information 700 can only take the value of "0" or "1", there is no formal difference.

Fifth Modified Example

At least one of the first core 11, the second core 12, and the third core 13 may be realized by a field programmable gate array (FPGA) which is a rewritable logic circuit or an application specific integrated circuit (ASIC) which is an application specific integrated circuit. According to the fifth modified example, the arithmetic device 1 can be realized by various hardware configurations.

Sixth Modified Example

The third core 13 may execute the control process when determining that there is no abnormality in step S603 of FIG. 9. That is, in the embodiment, the control process is executed by the second core 12, but the control process may be executed by the third core 13.

In the embodiment described above and the modified examples, the configuration of the functional block is merely an example. Some functional configurations illustrated as separate functional blocks may be integrally configured, or a configuration illustrated in one functional block diagram may be divided into two or more functions. In addition, some of the functions of each functional block may be included in another functional block.

Although not specifically described in the above-described embodiment, the encryption key and the seed merely need to be safely distributed, managed, and updated, and distribution and update may be performed at an arbitrary timing such as at the time of starting/stopping of the engine of the vehicle, at the time of product development, and at the time of maintenance.

The embodiments and the modified examples described above may be combined. Although various embodiments and modified examples have been described above, the present invention is not limited to the contents thereof. Other modes that can be considered within the scope of the technical idea of the present invention are also encompassed within the scope of the present invention.

The disclosed content of the following priority application is incorporated herein by reference.

Japanese Patent Application No. 2019-80069 (filed on Apr. 19, 2019)

REFERENCE SIGNS LIST

1 arithmetic device
5 interface unit
11 first core
12 second core
13 third core
21 first bus
22 second bus
23 third bus
31 first verification unit
32 second verification unit
33 control unit
34 verification destination determination processing unit
35 verification request processing unit
36 authority management unit

The invention claimed is:

1. A multi-core processor for a vehicle, the multi-core processor comprising:
  a first core that is communicatively coupled to an external communication bus and performs a first verification process on a message received from outside of the vehicle via the external communication bus;
  one or more other cores that perform arithmetic processing; and
  a second core that communicatively coupled to the external communication bus;
  a third core that is communicatively coupled to an internal communication bus;
  wherein the second core:
  determines whether the second core or the one or more other cores executes a second verification process on the message based on identification information included in the message,
  in response to determining that the one or more other cores execute the second verification process, requests execution of the second verification process by the one or more other cores,
  determines whether the third core executes the second verification process based on an instruction content of the message meeting a predetermined condition, and
  in response to determining that the third core executes the second verification process, requests execution of the second verification process by the third core.

2. The multi-core processor according to claim 1, wherein in response to determining that the second core does not execute the second verification process, the second core further: determines particular core among the one or more other cores, and requests the particular core to execute the second verification process.

3. The multi-core processor according to claim 1, wherein:
  the one or more other cores further:
  give authority to at least one of the first core, the second core, or the one or more other cores based on information included in the message in response to determining that no abnormality is found in the first verification process and the second verification process.

4. The multi-core processor according to claim 1, wherein when the second core further:
  in response to determining that the second core is to execute the second verification process, the second core executes the second verification process.

5. A computing system for a vehicle, the computing system comprising:
  an interface receives a message from outside of the vehicle via an external communication bus;
  a multi-core processor that is communicatively coupled to the interface, wherein the multi-core processor includes:
    a first core that performs a first verification process on the message;
    one or more other cores that perform arithmetic processing, and
    a second core that communicatively coupled to the external communication bus, and
    a third core that is communicatively coupled to an internal communication bus;
  wherein the second core:
    determines whether the second core or the one or more other cores executes a second verification process on the message based on identification information included in the message, in response to determining that the one or more other cores execute the second verification process, requests execution of the second verification process by the one or more other cores, determines whether the third core executes the second verification process based on an instruction content of the message meeting a predetermined condition, and in response to determining that the third core executes the second verification process, requests execution of the second verification process by the third core.

* * * * *